March 24, 1925. 1,531,174
R. H. BUTTERS ET AL
LOCK
Filed Aug. 15, 1921
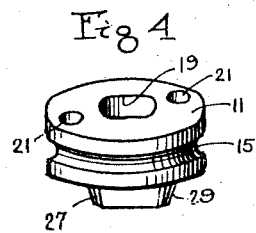
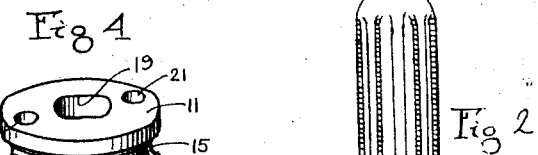
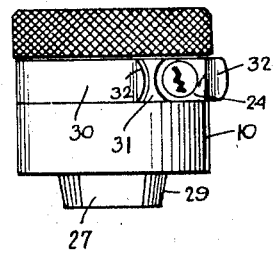
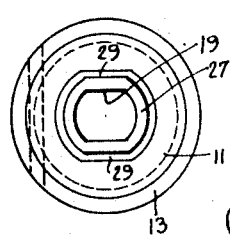
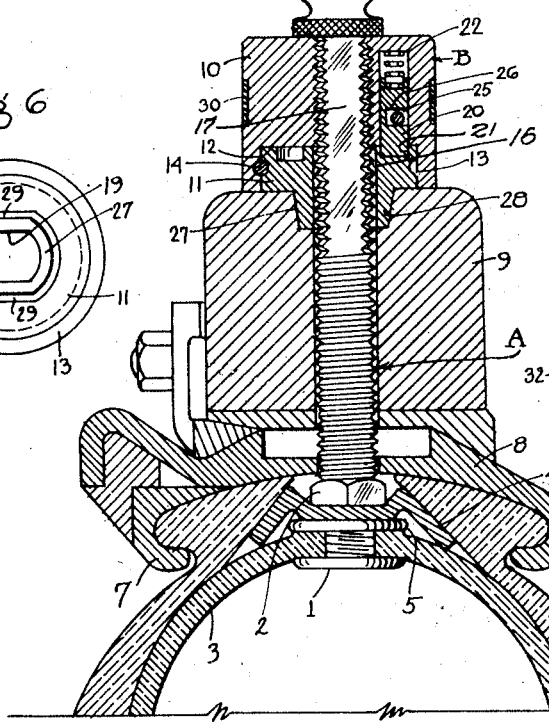
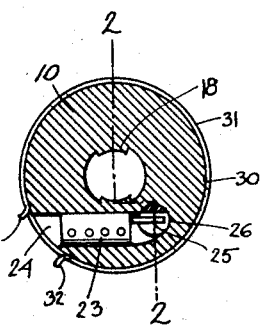
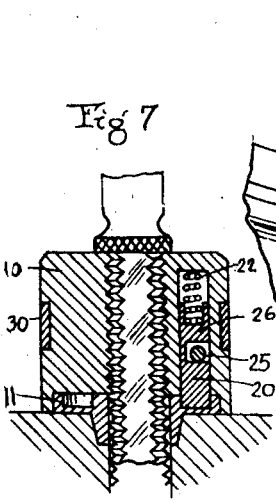
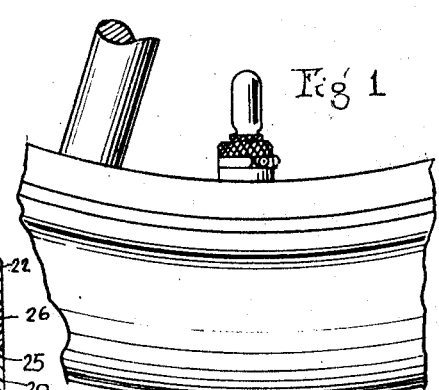
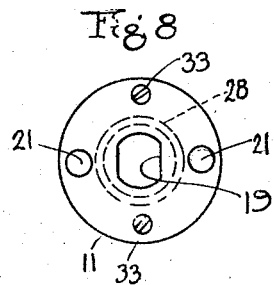
Robert H. Butters
Richard W. Starke
INVENTOR
BY *John D. Powers*
ATTORNEY Patented Mar. 24, 1925.

1,531,174

UNITED STATES PATENT OFFICE.

ROBERT H. BUTTERS AND RICHARD W. STARKE, OF ATLANTA, GEORGIA.

LOCK.

Application filed August 15, 1921. Serial No. 492,584.

*To all whom it may concern:*

Be it known that we, ROBERT H. BUTTERS and RICHARD W. STARKE, citizens of the United States, residing at Atlanta, in the county of Fulton and State of Georgia, have invented certain new and useful Improvements in Locks, of which the following is a specification.

This application is filed as a continuation, in so far as any features of common patentable novelty are concerned, of our pending application, Serial No. 431,273, filed December 16, 1920.

This invention relates to improvements in locks and more particularly to a lock of the general nature of a padlock, that is to say wherein the locking block is arranged externally of the object to be secured.

The principal objects of the invention are to provide a lock which can be easily and quickly applied and removed, which will secure the object or objects to be locked with rigidity, which cannot be tampered with nor removed except by the use of the proper key or other authorized manipulation, which will be strong and not liable to derangement, and which may be economically produced.

With the above objects in view the invention is directed to the combination of a stem and a locking block to be fitted on the stem and locked against endwise movement thereon and the invention consists particularly in novel structural features of the block, adapting it for cooperation with the stem and which will be pointed out in detail as the description proceeds.

The invention is shown in the accompanying drawing as an element of an organization for locking a tire to its mounting but it will be understood that the invention may be used as a device of general utility and that the particular useful application disclosed is selected merely as an example.

In said drawing:

Figure 1 is a perspective view showing a segment of a felly and tire and the locking block in operative position on the valve stem.

Figure 2 is a cross section, the locking block being shown on the line 2—2 of Figure 5.

Figure 3 is an elevation of the locking block.

Figure 4 is a perspective view of the keeper part of the locking block.

Figure 5 is a horizontal section of the locking block in which the lock mechanism is shown in plan.

Figure 6 is a bottom plan view thereof.

Figure 7 is a cross section similar to Figure 2 but showing a modified construction.

Figure 8 is a plan view of the keeper part of the modified construction.

The lock comprises a stem A and a locking block B in cooperation with said stem. As used for the purpose of locking a tire to its mounting the stem A may be constituted by the valve stem which is provided at its inner end with a head 1 for cooperation with a nut 2 by means of which the stem is secured to the inner casing 3. Externally of the inner casing the stem carries a spreader 4 which is confined between the nut 2 and a washer 5 and which presses from within against the marginal beads of the outer casing 6 and holds them engaged in the flanges 7 of the rim 8. The stem projects through openings in the rim 8 and felly 9 and the block B is secured to the projecting portion of the stem.

The block B comprises two co-axial parts 10 and 11 which, according to the invention, are provided with central openings to take over the stem A and have relative turning movement. In the construction preferred these parts are connected together whereby the block is a unitary device. For these purposes the part 11 has a rotatable fit within a recess 12 formed in the under face of the part 10 and providing a flange 13 which encloses and prevents access to said part 10; the parts thus related are connected together by a key 14 which is carried by the flange 13 and engages in a circumferential groove 15 of the part 10, thereby to permit said parts to be turned relatively to one another.

The projecting portion of the stem is provided with corrugations 16 preferably interrupted by flat sides 17 and, as shown in Figures 1 to 6, the block is formed to engage said corrugations and flat sides whereby it will be held against endwise and turning movement on the stem. In the construction disclosed the corrugations may be constituted by the usual threads of the valve stem which threads are continued to the outer end of the stem to provide for the attachment of the usual dust cap C. The relative turning movement of the parts 10 and 11 is effective to complete the engagement of the block with the stem and also to bring said parts into such relative position that they may be locked together. Thus the central opening of the part 10 is provided with interrupted corrugations 18, i. e., threads, for engagement with the corrugations 16 of the stem and the central opening of the part 11 is provided with flat sides 19 which fit closely and conform to the flat sides 17 of the stem. The parts 10 and 11 are locked together by a bolt 20 which is mounted in the part 10 for slidable movement in the direction of the axis of said part and which engages a keeper recess 21 formed in the inner face of the part 11.

In the construction disclosed and, as preferred, the bolt 20 is projected by a spring 22 and is retracted by lock mechanism, also carried by the part 10. Such mechanism may be of any suitable construction; as shown it includes a barrel 23 rotatably fitted in the part 10 with its axis at a right angle to the bolt 20. The barrel 23 is provided with a series of radially operating tumblers which normally, i. e., when the parts are locked together, project into recesses extending radially from the bore in which said barrel is fitted, all in the well known manner. The barrel 23 with the tumblers is preferably of the cylinder type operated by a paracentric key which may be engaged with said barrel through an opening 24 extending to the face of the block. The bolt 20 is thrown by a pin 25 projecting eccentrically from the inner end of the barrel and which extends into a recess 26 in the side of the bolt, said recess providing an overhanging shoulder with which the pin 25 cooperates.

The part 11 preferably has a central flange 27 and the opening formed in the felly (or other object) through which the stem projects is fashioned with a countersunk recess 28 into which the flange projects, the function of the flange being to prevent access to the stem with any instrument which might be used for cutting or breaking the stem from the tire at a point between the felly and the block B. The flange 27 preferably has external flat sides 29 and the recess 28 is shaped conformably, an advantage being thereby secured in that the block is held against turning movement relatively to the felly or adjacent object.

The block is preferably provided with a suitable dust guard for the lock barrel; as shown, a resilient contractile band 30 fits rotatably but closely in an annular groove 31 formed in the block. The ends of the band are fashioned to provide finger pieces 32 by which the band may be turned and are spaced apart sufficiently to provide a clearance by which the opening 24 may be uncovered, the band being normally positioned to cover said opening.

In use: The block is slipped over the stem A in a position wherein the flat sides 19 of the part 11 and the corrugation 18 of the part 10 lie adjacent the flat sides 17 of the stem, this movement being continued until arrested by the engagement of the block against the felly. In such relative position of the parts the bolt 20 presses against the flat inner face of the part 11 and is thereby held retracted. The part 11 is preferably provided with two recesses 21 located diametrically opposite and when the block has reached the limit of its movement along the stem the part 10 is given a quarter turn in either direction whereupon the bolt 20 under the pressure of its operating spring engages in one of the recesses 21. Thereby the block is locked against movement on the stem and can be removed only by the use of the proper key or other authorized manipulation of the lock mechanism, according to its structure. As thus locked on the stem the block will rigidly and positively secure the objects with which it is associated; in the construction disclosed it will secure the tire, that is to say the outer casing, against removal from the rim or the carrier and will also secure the rim, whether of clincher or demountable form against removal from the wheel.

The construction above described is preferred but the invention may with advantage be incorporated in the modified form shown in Figures 7 and 8. This modified construction is similar to the construction described except that the part 11 although, in point of function, a part of the block is not physically connected to the part 10 but is connected by screws 33 to the felly.

As connected by screws to the felly or as otherwise held against rotation relatively to the felly, for example by the engagement of the flange 27 with its flat sides 29 in the conforming recess 28, the block will be effectively locked even though the part 11 be non-rotatably related to the stem for the reason that the block will be held against both endwise and turning movement relatively to said stem. However the construction is to be preferred where, as shown, the valve stem has the flat sides 17 and the part 11 is non-rotatably engaged with said stem by means of conforming flat sides 19 of its central opening.

Having fully described our invention, we claim:

1. A locking block for co-operation with a stem comprising two co-axial co-operating parts relatively rotatable and having central openings through which the stem projects, one of the parts being non rotatable with respect to the stem, the other part and the stem being formed mutually to gage against relative endwise movement, a locking bolt for connecting said parts against relative rotation in the relative positions thereof wherein the stem is engaged by said one part against endwise movement, and lock mechanism carried by one part and operative to retract the bolt.

2. A locking block for co-operation with a stem comprising two co-axial co-operating parts, relatively rotatable and having central openings through which the stem projects, one of the parts and the stem being formed mutually to engage against relative turning movement, the other part and the stem being formed mutually to engage against relative endwise movement, a locking bolt for connecting said parts against relative rotation in the relative positions thereof wherein they engage the stem against turning and endwise movement respectively, and lock mechanism carried by one part and operative to retract the bolt.

3. A locking block for co-operation with a stem comprising two co-axial co-operating parts relatively rotatable and having central openings through which the stem projects, one of the parts being non-rotatable with respect to the stem, the other part and the stem being formed mutually to engage against relative endwise movement, a locking bolt for connecting said parts against relative rotation in the relative positions thereof wherein the stem is engaged by said one part against endwise movement, and lock mechanism carried by one part and operative to retract the bolt, one of the parts having a recess in its under face within which the companion part is fitted, said recess providing a circumscribing flange which extends to the object to be secured.

4. A unitary locking block for co-operation with a stem comprising two co-axial co-operating parts permanently connected together for relative rotation and having central openings through which the stem projects, one of the parts being non-rotatable with respect to the stem, the other part and the stem being formed mutually to engage against relative endwise movement, a locking bolt for connecting said parts against relative rotation in the relative positions thereof wherein the stem is engaged by said one part against endwise movement, and lock mechanism carried by one part and operative to retract the bolt.

5. A unitary locking block for co-operation with a stem comprising two co-axial co-operating parts relatively rotatable and having central openings through which the stem projects, one of the parts being non-rotatable with respect to the stem, the other part and the stem being formed mutually to engage against relative endwise movement, a locking bolt for connecting said parts against relative rotation in the relative positions thereof wherein the stem is engaged by said one part against endwise movement, lock mechanism carried by one part and operative to retract the bolt, one of the parts having a recess in its under face within which the companion part is fitted, said recess providing a circumscribing flange which extends to the object to be secured, the part fitted in said recess having a circumferential groove, and a pin bedded in said flange and engaging in said groove to couple the parts permanently together and permit relative rotation thereof.

6. A locking block for co-operation with a stem comprising two co-axial co-operating parts relatively rotatable and having central openings through which the stem projects, one of the parts being non-rotatable with respect to the stem, the other part and the stem being formed mutually to engage against relative endwise movement, a locking bolt for connecting said parts against relative rotation in the relative positions thereof wherein the stem is engaged by said one part against endwise movement, and lock mechanism carried by one part and operative to retract the bolt, one of the parts having a projecting flange which surrounds the stem and for which the object to be secured has a recess, said flange thereby preventing access to the stem at a point between said object and the block.

7. A locking block for co-operation with a stem and having a central opening through which the stem projects and means for locking the block against endwise movement on the stem, the block having a projecting flange which surrounds the stem and for which the object to be secured has a recess, said flange thereby preventing access to the stem at a point between said object and the block.

8. A locking block for co-operation with a stem comprising two co-axial co-operating parts relatively rotatable and having central openings through which the stem projects, one of the parts being non-rotatable with respect to the stem, the other part and the stem being formed mutually to engage against endwise movement, a locking bolt carried by said part engaging the stem against endwise movement and movable in the direction of the axis of said part, said bolt connecting said parts against relative rotation in the relative positions thereof wherein the stem is engaged by said one part against endwise movement, and lock mechanism also carried by said part engaging the stem against endwise movement and operative to retract said bolt.

9. A locking block for co-operation with a stem comprising two co-axial co-operating parts relatively rotatable and having central openings through which the stem projects, one of the parts being non-rotatable with respect to the stem, the other part and the stem being formed mutually to engage against endwise movement, a locking bolt carried by said part engaging the stem against endwise movement and movable in the direction of the axis of said part, said bolt connecting said parts against relative rotation in the relative positions thereof wherein the stem is engaged by said one part against endwise movement, and lock mechanism also carried by said part engaging the stem against endwise movement and operative to retract said bolt, the part which carries said bolt and lock mechanism having a recess in its under face within which the companion part is fitted, said recess providing a circumscribing flange which extends to the object to be secured.

10. A unitary locking block for co-operation with a stem comprising two co-axial co-operating parts relatively rotatable and having central openings through which the stem projects, one of the parts being non-rotatable with respect to the stem, the other part and the stem being formed mutually to engage against endwise movement, a locking bolt carried by said part engaging the stem against endwise movement and movable in the direction of the axis of said part, said bolt connecting said parts against relative rotation in the relative positions thereof wherein the stem is engaged by said one part against endwise movement, lock mechanism also carried by said part engaging the stem against endwise movement and operative to retract said bolt, the part which carries said bolt and lock mechanism having a recess in its under face within which the companion part is fitted, said recess providing a circumscribing flange which extends to the object to be secured, the part fitted in said recess having a circumferential groove, and a pin bedded in said flange and engaging in said groove to couple the parts permanently together and permit relative rotation thereof.

11. A locking block for co-operation with a stem comprising two co-axial co-operating parts relatively rotatable and having central openings through which the stem projects, one of the parts being non-rotatable with respect to the stem, the other part and the stem being formed mutually to engage against endwise movement, a locking bolt carried by said part engaging the stem against endwise movement and movable in the direction of the axis of said part, said bolt connecting said parts against relative rotation in the relative positions thereof wherein the stem is engaged by said one part against endwise movement, and lock mechanism also carried by said part engaging the stem against endwise movement and operative to retract said bolt, the non-rotatable part having a projecting flange which surrounds the stem and for which the object to be secured has a recess, said flange thereby preventing access to the stem at a point between said object and the block.

12. A locking block for co-operation with a stem and having a central opening through which the stem projects, said block having a bolt by which it may be fixed against movement on the stem, lock mechanism for operating said bolt, said block having an opening through which said mechanism is exposed to provide for the insertion of a key, and a band encircling and rotatably fitted on said block and normally closing said opening, thereby to provide a dust guard for said mechanism, said band being formed to uncover said opening upon movement to a definite position.

13. In a tire lock, the combination with a tire valve stem, of a tubular body having a flat sided bore adapted to engage the flat side of a valve stem, a member rotatable on the body and having a screw-threaded engagement with the valve stem, and manually releasable means for positively locking said rotatable member against rotation.

14. In a valve stem tire lock, a substantially tubular member adapted to be positioned on a valve stem, means on said tubular member for holding it against rotation on said stem, and means rotatable to occupy one position in which it is adapted to lie contiguous to the flat sides of said valve stem to permit removal of the member, and another position in which it is adapted to engage the threads of the valve stem for locking the member against removal.

15. In a valve stem tire lock, a substantially tubular member adapted to be positioned on a valve stem, means on said tubular member for holding it against rotation on said stem, means rotatable to occupy one position in which it is adapted to lie contiguous to the flat sides of said valve stem to permit removal of the member, and another position in which it is adapted to engage the threads of the valve stem for locking the member against removal, and means for locking the rotatable means in the second mentioned position.

In testimony whereof we affix our signatures.

ROBERT H. BUTTERS.
RICHARD W. STARKE.